US008450952B2

(12) United States Patent
Lahteenmaki

(10) Patent No.: US 8,450,952 B2
(45) Date of Patent: May 28, 2013

(54) POWER SUPPLY APPARATUS AND POWER SUPPLY ARRANGEMENT

(75) Inventor: Jussi Lahteenmaki, Hyvinkää (FI)

(73) Assignee: Kone Corporation, Helsinki (FI)

( * ) Notice: Subject to any disclaimer, the term of this patent is extended or adjusted under 35 U.S.C. 154(b) by 82 days.

(21) Appl. No.: 12/899,317

(22) Filed: Oct. 6, 2010

(65) Prior Publication Data

US 2011/0040422 A1 Feb. 17, 2011

Related U.S. Application Data

(63) Continuation of application No. PCT/FI2009/000037, filed on Mar. 26, 2009.

(30) Foreign Application Priority Data

Apr. 7, 2008 (FI) .................................... 20080270

(51) Int. Cl.
*H02P 5/46* (2006.01)

(52) U.S. Cl.
USPC ............... 318/34; 700/90; 700/286; 700/295

(58) Field of Classification Search
USPC .............................. 318/34; 700/90, 286, 295
See application file for complete search history.

(56) References Cited

U.S. PATENT DOCUMENTS

| 4,691,269 | A | * | 9/1987 | Yamane et al. | ................ | 363/41 |
| 5,177,678 | A | * | 1/1993 | Ibori et al. | ..................... | 363/98 |
| 5,640,315 | A | * | 6/1997 | Hirano et al. | .................... | 363/41 |
| 5,744,927 | A | * | 4/1998 | Hayashida | .................... | 318/599 |
| 6,107,776 | A | * | 8/2000 | Nakazawa | .................... | 318/811 |
| 7,652,443 | B2 | * | 1/2010 | Schulz et al. | ................. | 318/432 |
| 2005/0073272 | A1 | * | 4/2005 | Nagashima et al. | .......... | 318/268 |

(Continued)

FOREIGN PATENT DOCUMENTS

| JP | 58159696 A | * | 9/1983 |
| JP | 61-207197 A | | 9/1986 |

(Continued)

OTHER PUBLICATIONS

Lowrey T. et al. "Application considerations for PWM inverter-fed low-voltage induction motors,"Petroleum and Chemical Industry Conference, 1992, Record of Conference Papers, Industry Applications Society 29th Annual San Antonio, TX, USA Sep. 28-30, 1992, Introduction, chapters 111 A-111 B, figure 6, and table 2.

(Continued)

*Primary Examiner* — Kawing Chan
(74) *Attorney, Agent, or Firm* — Birch, Stewart, Kolasch & Birch, LLP.

(57) ABSTRACT

The invention relates to a power supply apparatus and also to a power supply arrangement. The power supply apparatus comprises an interface to the load. The power supply apparatus also comprises at least one controllable solid-state switch, for supplying power between the aforementioned load and the power supply apparatus. The power supply apparatus comprises a controller, which is fitted to control the at least one controllable solid-state switch at the selected switching frequency. The switching frequency is selected such that the noise of the load corresponding to the selected switching frequency meets the selection criterion.

7 Claims, 4 Drawing Sheets

U.S. PATENT DOCUMENTS

| | | | |
|---|---|---|---|
| 2005/0218853 A1 * | 10/2005 | Kokami | 318/599 |
| 2006/0164872 A1 * | 7/2006 | Fukumoto | 363/21.04 |
| 2008/0066038 A1 * | 3/2008 | Masumura | 716/9 |
| 2009/0108780 A1 * | 4/2009 | Schulz et al. | 318/139 |
| 2011/0040422 A1 * | 2/2011 | Lahteenmaki | 700/295 |

FOREIGN PATENT DOCUMENTS

| | | | |
|---|---|---|---|
| JP | 61224900 A * | 10/1986 | |
| JP | 1-295691 A | 11/1989 | |
| JP | 2-52877 A | 2/1990 | |
| JP | 5-178550 A | 7/1993 | |
| JP | 07059201 A * | 3/1995 | |
| JP | 2005-102346 A | 4/2005 | |
| JP | 2008-109819 A | 5/2008 | |

OTHER PUBLICATIONS

Riming S. et al. "A PWM Strategy for Acoustic Noise Reduction for Grid-Connected Single-Phase Inverters," Applied Power Electronics Conference, APEC 2007—Twenty Second Annual IEEE, 2007, Introduction and conclusion.

* cited by examiner

POWER SUPPLY APPARATUS AND POWER SUPPLY ARRANGEMENT

This application is a Continuation of PCT International Application No. PCT/FI2009/000037 filed on Mar. 26, 2009, which claims the benefit of Patent Application No. 20080270 filed in Finland, on Apr. 7, 2008. The entire contents of all of the above applications is hereby incorporated by reference into the present application.

FIELD OF THE INVENTION

The object of the invention is a power supply apparatus as defined in one or more of the claims, a power supply arrangement of a transport system as defined in the one or more of the claims, and a method for controlling a power supply apparatus as defined in one or more of the claims.

When power is supplied with a frequency converter, e.g. to an electric motor, the operation of the switches of the frequency converter causes switching frequency fluctuation in the current of the electric motor. Fluctuation of current produces noise in the electric motor, which can be disturbing. Conventionally, separate noise filters are added to the supply cables between the electric motor and the frequency converter, with which it is endeavored to reduce the aforementioned current fluctuation.

The noise of an electric motor might be disturbing also e.g. in modern elevator systems that are without machine rooms, in which the elevator motor is disposed in the elevator hoistway.

The purpose of this invention is to solve the aforementioned problems and the problems disclosed in the description of the invention below. Thus a power supply apparatus is disclosed in the invention, with which the noise of the load to be supplied is quieter than in prior art.

The power supply apparatus, power supply arrangement of a transport system, and method according to the invention for controlling a power supply apparatus is characterized by what is disclosed in the independent claims. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The topology of the main circuit in the power supply apparatus according to the invention can be varied. The main circuit comprises, however, at least one controllable solid-state switch, such as an IGBT transistor, a MOSFET transistor, a thyristor, a bipolar transistor or an SCR (silicon controlled rectifier) switch. The power supply apparatus according to the invention can be e.g. a DC/DC transformer, an AC/DC transformer, a DC/AC transformer or an AC/AC transformer. The power supply apparatus can be e.g. a frequency converter, a matrix converter or a power supply apparatus of a DC motor with an H-bridge circuit.

The load according to the invention can be e.g. an electric motor, a generator or some other inductive load, for instance the coil of an electromagnetic brake, such as the coli of the brake of an elevator machine.

One power supply apparatus according to the invention can be connected to a power source, which power source can be e.g. an electricity network, and the power source can also be some backup power source, such as a generator, a fuel cell, an accumulator or a supercapacitor.

The transport system according to the invention can be e.g. an elevator system, an escalator system, a travelator system, a direct drive elevator system, a crane system or a vehicle system. A transport appliance refers to the moved part of a transport system, such as an elevator car or the moving track of an escalator/travelator. The elevator system according to the invention can be with machine room or without machine room. Further, the elevator system can be either with counterweight or without counterweight.

The plurality of switching frequencies referred to in the invention can be discrete or continuous.

The determination of the power loss of the solid-state switch can occur e.g. on the basis of some measured or estimated electrical parameter, such as voltage, current and transient power, of the switch. The determination can also occur e.g. on the basis of the measurement or estimation of the temperature of a switch or of cooling element possibly connected to the switch. The determination of the power loss according to the invention can if necessary be performed also for more than one solid-state switch.

The electric motor according to the invention can be e.g. an alternating current motor or a direct current motor. This type of motor is e.g. a synchronous motor, a permanent-magnet motor, a squirrel-cage motor, a direct-current motor with or without brushes, a reluctance motor or a step motor. The motor can be either a rotating motor or a linear motor.

When an electric motor is used to move a transport appliance, the motor can also comprise a mechanical fitting for transmitting power between the motor and the transport appliance. This type of fitting can be e.g. a shaft, a gearbox or, for instance, the traction wheel of an elevator.

In one transport system according to the invention the power loss of the solid-state switches is determined on the basis of the load of the transport appliance.

The solid-state switches referred to in the invention can be e.g. IGBT transistors, MOSFET transistors, thyristors, SCR (silicon controlled rectifier) switches, or bipolar transistors.

The control of the power supply apparatus according to the invention can be implemented by programming e.g. with a microprocessor or with a programmable logic circuit, and it can also implemented, for instance, with integrated or discrete analog or digital electronics.

The determination of the power loss of the solid-state switch according to the invention can be separate or it can also be integrated wholly or partially, e.g. in connection with the control of the power supply apparatus.

The memory of the control of the power supply apparatus according to the invention can be e.g. a semiconductor memory, such as an EEPROM memory.

One network bridge according to the invention is fitted between the phases of the alternating electricity source and the DC intermediate circuit. The network bridge comprises diodes connected to be a rectifying bridge, for rectifying the voltage of the alternating electricity source into the voltage of the DC intermediate circuit. Another network bridge according to the invention additionally comprises controllable solid-state switches connected in parallel with the aforementioned diodes, in which case with the aforementioned type of network bridge it is possible to supply power in both directions between the alternating electricity source and the DC intermediate circuit.

The operation of the solid-state switches of the power supply apparatus causes a switching-frequency fluctuation of current and of voltage in the load to be supplied. The switching frequency and its harmonics cause resonance-frequency vibrations in the load, which radiate as sound. The vibrations can also be conducted from the load into the environment, e.g. via the supporting structures surrounding the load. Thus e.g. the noise of the elevator motor in the elevator hoistway can travel from the hoistway to elsewhere in the building or, for instance, to inside the elevator car. When the switching frequency to be used is selected according to the invention on the basis of the noise of the load corresponding to the switching frequency, a quieter noise of the load can be achieved without separate noise filters, or when using a noise filter in addition a quieter load noise than that of prior art can be achieved.

The power loss of the solid-state switches of the power supply apparatus increases as the loading increases. The power loss is generally divided into conductor losses and switching losses. Switching losses increase as the switching frequency of the switches increases. In this case the power loss of the switches and the temperature rise of the switches can be reduced as the loading increases by reducing the switching frequency. When a plurality of permitted switching frequencies is delimited as presented in the invention on the basis of the determination of the power loss of the solid-state switches, and further the frequency to be used is selected on the basis of the load corresponding to the switching frequency, the permitted switching frequencies can be delimited to be lower with a large load than with a small load. In this way the quietest possible noise of the load can be achieved in each possible loading situation.

BRIEF DESCRIPTION OF THE DRAWINGS

In the following, the invention will be described in more detail by the aid of a few examples of its embodiments with reference to the attached drawings, wherein.

DETAILED DESCRIPTION

Figure 1:
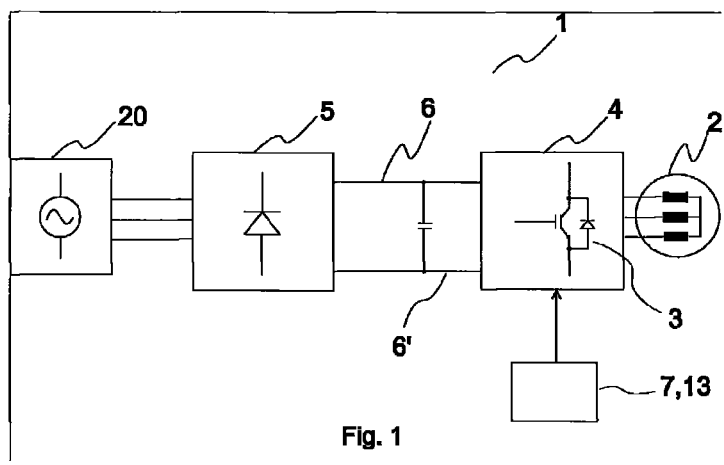
FIG. 1 presents a power supply apparatus according to the invention

FIG. 1 presents a power supply apparatus 1. The power supply apparatus is connected between the electric motor 2 and the electricity network 20. The power supply apparatus comprises a network bridge 5, which is connected to the phases of the electricity network, as well as a load bridge 4, which is connected to the phases of the electric motor. The network bridge and the load bridge are connected to each other with a DC intermediate circuit 6,6'. The connection of the main circuit of the load bridge is e.g. of the type presented in FIG. 5. The load bridge comprises solid-state controllable switches 3. The switches are fitted to be change-over switches between the positive and the negative intermediate circuit busbar of the DC intermediate circuit 6,6'. The phases of the electric motor are connected to the outputs 25 of the change-over switches. The control 7 connects the solid-state change-over switches alternately to the positive 6 and the negative 6' intermediate circuit busbar of the DC intermediate circuit 6,6' to produce variable frequency and variable amplitude supply voltage in the phases of the electric motor. The control 7 is fitted to control the solid-state change-over switches at the selected switching frequency with pulse width modulation.

Figure 2:
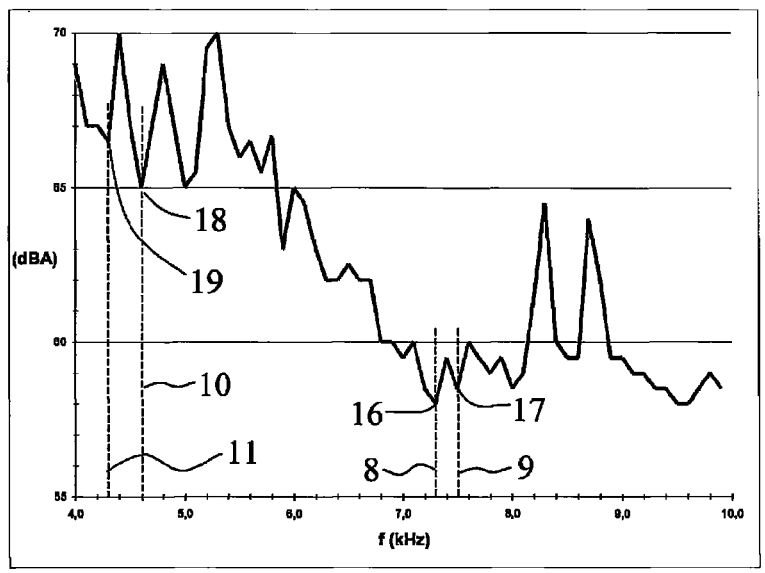
FIG. 2 presents the noise level corresponding to the different frequencies of the electric motor according to the invention

FIG. 2 presents the noise of the electric motor 2 at different switching frequencies. The power supply of the electric motor is in this case arranged e.g. with a power supply apparatus 1 according to FIG. 1. The noise of the electric motor is determined as an acoustic pressure measurement, in which case the unit of the determined noise level is dbA. The noise level according to the graph presented in FIG. 2 has local minimum points and maximum points. The switching frequencies 8,9,10,11, in the environs of which the noise level has local minimum points, and also the local minimums 16,17,18,19 of the noise level corresponding to the switching frequencies, are determined. On the basis of the determined noise level, the switching frequency for which the corresponding noise level of the load is the smallest is selected, and the selected switching frequency is set as the switching frequency of the control 7 of the power supply apparatus 1.

Figure 5:
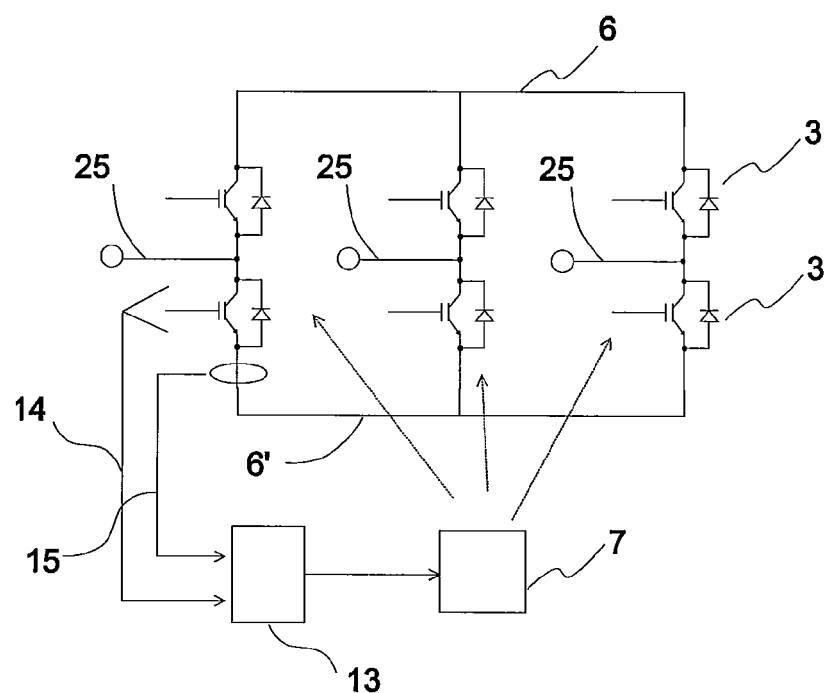
FIG. 5 presents a connection of the main circuit of the load bridge of the power supply apparatus of the motor according to the invention

In one embodiment of the invention the power supply apparatus also comprises the type of determination 13 of the power loss of the solid-state switch 3 presented in FIG. 5. In this case the determination 13 comprises at least a measurement 15 of the current of the switch. The determination can also comprise a measurement 14 of the voltage of the switch, but this is not necessary, especially if the voltage of the electricity network or the voltage of the intermediate circuit of the power supply apparatus is known. On the other hand, the determination can also be performed e.g. on the basis of the temperature of the solid-state switch or of the cooling element of the switch. The switching frequencies 8,9,10,11, in the environs of which the noise level has local minimum points, and the local minimums 16,17,18,19 of the noise level corresponding to the switching frequencies are tabled in the memory of the control 7. The determination 13 of the power loss determines the power loss of one or more solid-state switches. The control 7 of the power supply apparatus reads the determined power loss, and delimits a plurality of permitted switching frequencies 10, 11 from the plurality of tabled switching frequencies on the basis of the determined power loss. The control compares the tabled noise levels 18,19 of the load that correspond to the permitted switching frequencies, and on the basis of the comparison, selects the switching frequency for which the noise level of the load corresponding to it is smallest from the plurality of permitted switching frequencies.

The aforementioned measurement 15 of the current of the switch can be performed also on the phase current of the motor, or e.g. on the current of the DC intermediate circuit of the power supply apparatus.

Figure 3:
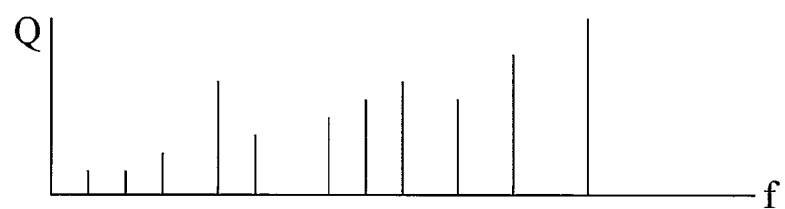
FIG. 3 presents the switching frequencies evaluated according to a quality factor

FIG. 3 presents the switching frequencies f of the solid-state switches of the power supply apparatus evaluated according to a quality factor Q. In this case the switching frequency that has the best quality factor within the limits set by the loading of the solid-state switches can be selected as the switching frequency to be used.

Figure 4:
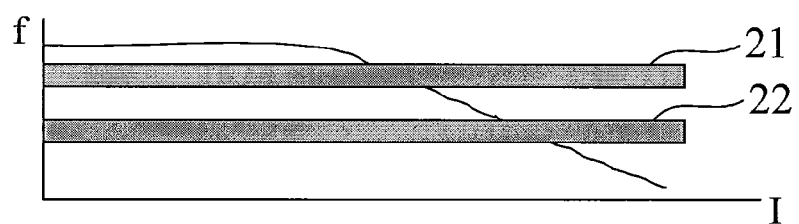
FIG. 4 presents a plurality of permitted switching frequencies as a function of the loading of the power supply apparatus

The graph in FIG. 4 presents the permitted switching frequency f as a function of the loading l of the solid-state switches of the power supply apparatus. As the loading increases, the maximum value of the permitted switching frequency decreases. The prohibited zones 21, 22 for switching frequency, in which the noise of the load is at its maximum point, are marked in the figure.

Figure 6:
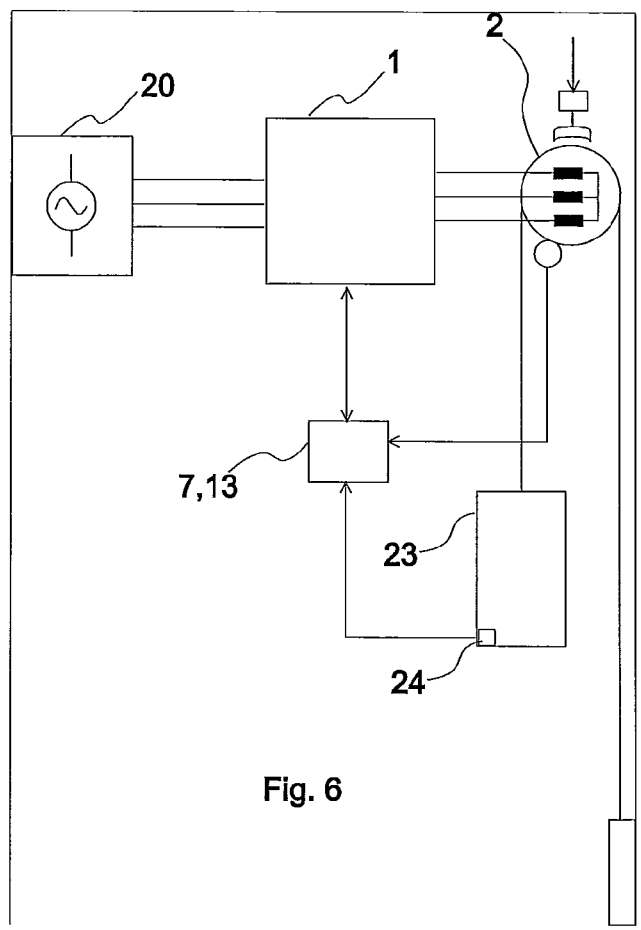
FIG. 6 presents an elevator system according to the invention

FIG. 6 presents an elevator system according to the invention. The type of power supply apparatus 1 presented in FIG.

1 is fitted to the elevator system. Power supply between the electric network 20 and the elevator motor 2 occurs with the control of the solid-state switches of the power supply apparatus 1. The electric motor 2 moves the elevator car 22 in the elevator hoistway via ropes connected to the traction sheave of the elevator motor. In this embodiment of the invention a load-weighing sensor 24, with which the load of the elevator car is determined, is fitted to the elevator car. The loading of the power supply apparatus is dependent on the imbalance of the forces acting in the elevator system such that as the imbalance between the elevator car and the counterweight increases, the loading of the power supply apparatus also increases. On the other hand, if the elevator system is without counterweight, the loading of the power supply apparatus increases as the load of the elevator car increases. In this embodiment of the invention the power loss of the solid-state switches of the power supply apparatus 1 are determined also on the basis of the determination of the load of the elevator car, and a plurality of permitted switching frequencies of the solid-state switches of the power supply apparatus 1 are delimited on the basis of the determination of power loss. From the plurality of permitted switching frequencies the switching frequency for which the noise level of the elevator motor 2 corresponding to it is smallest is selected for use. For this purpose the noise level can be measured e.g. with a microphone placed in the elevator hoistway in the proximity of the elevator motor; on the other hand, transmitted noise can also be measured e.g. in the elevator car 22.

The invention is described above by the aid of a few examples of its embodiment. It is obvious to the person skilled in the art that the invention is not limited to the embodiments described above, but that many other applications are possible within the scope of the inventive concept defined by the claims presented below.

The invention claimed is:

1. A power supply apparatus, comprising:
   an interface to a load;
   at least one controllable solid-state switch for supplying power between the load and the power supply apparatus; and
   a controller that controls the at least one solid-state switch at a selected one of a plurality of permitted switching frequencies, the controller configured to limit the plurality of permitted switching frequencies on the basis of a determination of power loss of at least one solid-state switch, to compare noise levels of the load corresponding to the permitted switching frequencies, and to select, on the basis of the comparison, the switching frequency for which the noise level of the load corresponds to it is its smallest;
   wherein the noise levels of the load are determined at different switching frequencies such that local minimum points and maximum points of the noise level of the load are determined; and
   wherein the switching frequencies in the environs of which the noise level has local minimum points, and also the local minimums of the noise level corresponding to the switching frequencies, are determined.

2. Power supply apparatus according to claim 1, further comprising:
   a network bridge and a load bridge connected to the load, the load bridge including a plurality of controllable solid-state switches,
   wherein the network bridge and load bridge are connected to each other with a direct-current intermediate circuit; and
   wherein the controller controls the solid-state switches of the load bridge at the selected frequency.

3. Power supply apparatus according to claim 1, wherein the controller includes a memory, having stored therein a plurality of switching frequencies as well as the noise levels of the load that correspond to the plurality of switching frequencies.

4. Power supply apparatus according to claim 1, wherein the switching frequency of at least one solid-state switch is selected by comparing the noise levels of the load that correspond to at least two switching frequencies, and wherein, on the basis of the comparison, the switching frequency for which the corresponding noise level of the load is smallest is selected.

5. Power supply apparatus according to claim 1, wherein the switching frequency is selected repeatedly during the power supply.

6. A transport system, comprising:
   an electric motor for moving a transport appliance;
   a power supply apparatus connected to the electric motor, and including at least one controllable solid-state switch for supplying power between the electric motor and a power supply; and
   a controller that controls the at least one solid-state switch at a selected one of a plurality of permitted switching frequencies, the controller controlled to limit the plurality of permitted switching frequencies on the basis of a determination of power loss of at least one solid-state switch, to compare noise levels of the electric motor corresponding to the permitted switching frequencies, and to select, on the basis of the comparison, the switching frequency for which the noise level of the electric motor corresponding to it is its smallest;
   wherein the noise levels of the electric motor are determined at different switching frequencies such that local minimum points and maximum points of the noise levels of the electric motor are determined; and
   wherein the switching frequencies in the environs of which the noise level has local minimum points, and also the local minimums of the noise level corresponding to the switching frequencies, are determined.

7. A method for controlling at least one controllable solid-state switch a power supply apparatus, the method comprising:
   connecting a load to the power supply apparatus;
   determining noise levels of the load at different switching frequencies such that local minimum points and maximum points of the noise level of the load are identified;
   determining the switching frequencies in the environs of which the noise level has local minimum points, and also the local minimums of the noise level corresponding to the switching frequencies;
   limiting a plurality of permitted switching frequencies on the basis of a determination of power loss of at least one solid-state switch;
   comparing noise levels of the load corresponding to the permitted switching frequencies; and
   selecting, on the basis of the comparison, the switching frequency for which the noise level of the load corresponding to it is its smallest.

* * * * *